United States Patent
Chang et al.

(10) Patent No.: US 6,320,899 B1
(45) Date of Patent: Nov. 20, 2001

(54) TWO-DIMENSIONAL DEMODULATOR IN SPREAD SPECTRUM CODE DIVISION MULTIPLE ACCESS SYSTEM WITH ANTENNA ARRAY

(75) Inventors: Kyung Hi Chang; Eung Soon Shin; Youn Ok Park; Mun Geon Kyeong, all of Daejon-Shi (KR)

(73) Assignees: Electronics and Telecommunications Research Institute, Daejon Shi; SK Telecom Co., Ltd., Seoul, both of (KR)

(*) Notice: Subject to any disclaimer, the term of this patent is extended or adjusted under 35 U.S.C. 154(b) by 0 days.

(21) Appl. No.: 09/144,235

(22) Filed: Aug. 31, 1998

(30) Foreign Application Priority Data

Dec. 26, 1997 (KR) .................................. 97-74741

(51) Int. Cl.[7] .................................................. H04B 1/707
(52) U.S. Cl. ......................... 375/147; 375/150; 342/378
(58) Field of Search ........................ 375/130, 259, 375/147, 142, 148, 150; 342/373, 378; 455/562; 370/320, 335, 342, 441

(56) References Cited

U.S. PATENT DOCUMENTS

| 5,621,752 | 4/1997 | Antonio et al. ................. 375/200 |
| 6,018,317 | * 1/2000 | Dogan et al. .................... 342/378 |
| 6,101,399 | * 8/2000 | Raleigh et al. .................. 455/561 |
| 6,108,565 | * 8/2000 | Scherzer ........................... 455/562 |

OTHER PUBLICATIONS

John S. Thompson, et al., "Smart Antenna Arrays for CDMA Systems", 1996, pp. 16–25.

Ayman F. Naguib, et al., "Performance of Wireless CDMA with M –ary Orthogonal Modulation and Cell Site Antenna Arrays", 1996, pp. 1770–1783.

\* cited by examiner

*Primary Examiner*—Don N. Vo
(74) *Attorney, Agent, or Firm*—Cohen, Pontani, Lieberman & Pavane

(57) ABSTRACT

The present invention relates to structures of the spread CDMA system of band diffusion with antenna array. The present invention, structures of 2-D demodulator are provided, for spread spectrum CDMA systems with antenna array which can increase coverage area of base station and system capacity, by extracting and combining all information needed in time and space domains, using only the information which shall be calculated in a CDMA system inherently.

10 Claims, 4 Drawing Sheets

TWO-DIMENSIONAL DEMODULATOR IN SPREAD SPECTRUM CODE DIVISION MULTIPLE ACCESS SYSTEM WITH ANTENNA ARRAY

BACKGROUND OF THE INVENTION

1. Field of Invention

The present invention relates to a structure of a 2-D (2 dimensional) demodulator for the spread spectrum Code Division Multiple Access (CDMA) system with antenna array, and more particularly to a structure of a 2-D demodulator to extract all useful information in time and space domains.

2. Description of the Prior Art

Typically, a spread spectrum CDMA system not to use antenna array generally combines and uses only the information in a time domain by RAKE receiver. On the contrary, if antenna array is used, a 2-D demodulator of a special type to use simultaneous utilization of information in a space domain as well as in a time domain is required. Up to now, antenna array in the mobile communication systems has usually applied to the Time Division Multiple Access (TDMA) system. As the result, only structures of demodulators suitable for the TDMA system have been proposed. Lately, antenna array is used for the spread spectrum CDMA system. In such case, as it is based on the selection of MUSIC or more complicated direction finding algorithm for the demodulator in a base station, a question is raised for its realization. Such phenomenon may cause more serious problems in future mobile communication systems, which require high-speed data transmission. Also, such method has a problem that performance becomes degraded if the number of activated users per sector of a base station is more than the number of antenna array elements or correlated signals are incident. In addition, the method has a problem of convergence in the case of the blind algorithm which does not need separate reference signals, and calculates direct beamforming weighing factors without prediction for incoming directions.

SUMMARY OF THE INVENTION

Accordingly, the present invention is directed to provide a structure of a 2-D demodulator for a CDMA systems with antenna array which can increase the coverage area of a base station and system capacity, by extracting and combining all information available in time and space domains, not using such algorithm like direction finding to need separate complicated calculation and using only the information which shall be essentially calculated in the CDMA system.

To achieve the above object, a structure of 2-D demodulator for the spread spectrum CDMA system, with antenna array according to the Example 1 of the present invention, includes a multipath detector which receives sampled digital baseband signals, outputs the time information where multipath signals, the phase information of transmitting codes, are located, and outputs correlation values if the value is larger than threshold value comparing the correlation value of snap shot signals and expected code sequences with the threshold value established in advance; multiple beamformers which receive correlation values output from the above multipath detector and sampled digital baseband signals, and create multiple scalarr signals of linear combination using the space information associated with incoming direction of the sampled digital baseband signals; multiple multipath trackers which execute code tracking to make phase conform to transmitting codes by input of phase information from the multipath detector and scalarr signals created from multiple beamformers, and which create multiple scalarr signals and frequency error components for each path after time-align process among paths; and a multicoupling combiner which combines multiple scalarr signals and frequency error components created from the multiple multipath trackers for the time domain.

To achieve the above object, a structure of a 2-D demodulator for the spread spectrum CDMA system with antenna array according to Example 2 of the present invention, includes a multipath detector which receives sampled digital baseband signals and outputs time information where multipath signals, the phase information of transmitting codes, are located; multiple multipath trackers which execute code tracking for each path by the input of phase information of transmitting codes output from the multipath detector and create correlation values of multipaths, which is the time information for space signals, snapshot signals and tracked code sequences; multiple beamformers which create scalarr signals for each path by the input of time information for space signals created from the multiple multipath trackers and of the despreaded snapshot signals; and a multipath combiner which combines scalar signals of each path, created from the multiple beamformers.

It is to be understood that both the foregoing general description and the following detailed description are exemplary and explanatory and are intended to provide further explanation of the invention as claimed.

BRIEF DESCRIPTION OF THE DRAWINGS

The above object, and other features and advantages of the present invention will become more apparent by describing the preferred embodiment thereof with reference to the accompanying drawings, in which.

Similar reference characters refer to similar parts in the several views of the drawings.

DETAILED DESCRIPTION OF THE PREFERRED EMBODIMENTS

Reference will now be made in detail to the preferred embodiments of the present invention and to examples of which are illustrated in the accompanying drawings.

Figure 1:
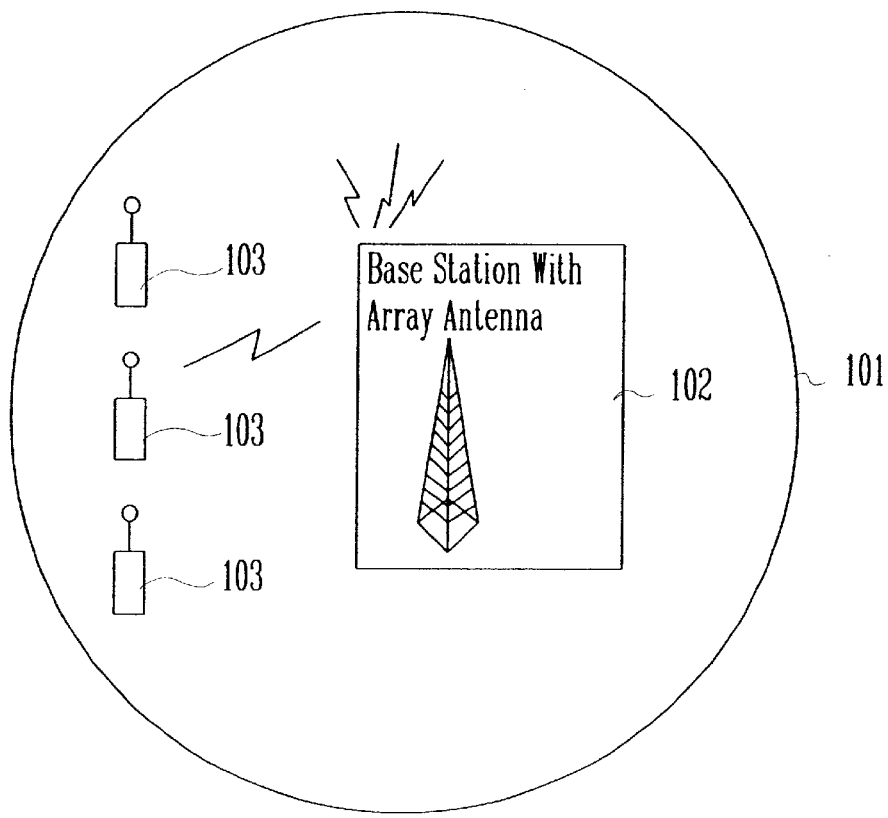
FIG. 1 shows a structure of the mobile communication system which the present invention is applied.

FIG. 1 shows a structure of the mobile communication systems which the present invention is applied.

One cell 101 consists of a base station 102 and multiple mobile stations 103, and these cells 101 gather and consist of a radio section of an entire mobile communication network. The base station 101 the present invention applies to has antenna array, and this may apply to all the receiving and transmitting. Each cell 101 may be divided into 2 or more sectors, and then, the transmitting/receiving antenna array may exist for each sector or exists as a separate array antenna. There is no need for each cell 101 type to be a circular shape.

Figure 2:
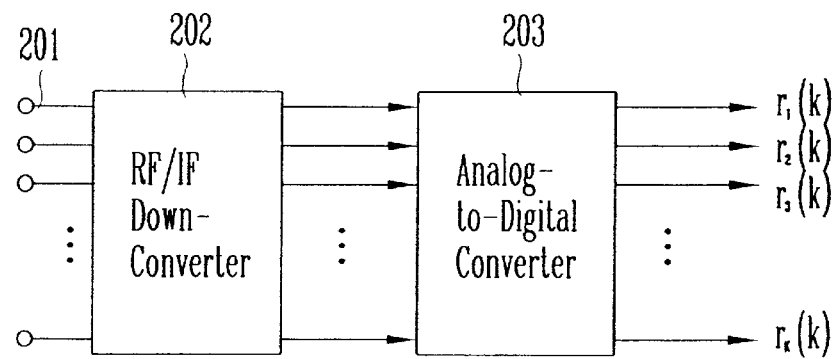
FIG. 2 shows a configuration diagram of a down converter of radio frequencies/intermediate frequencies and an analog-to-digital converter in a receive unit of a base station with antenna array.

FIG. 2 shows a configuration diagram of a down converter of radio frequencies/intermediate frequencies and an analog-to-digital converter in a receive unit of a base station with an antenna array, and the sections create the baseband digital signal $r_1(k), r_2(k), \ldots,$ and $r_K(k)$ from Radio Frequency (RF) signals received in an antenna array 201. An antenna array 201 need not be a linear antenna, and it may be circular or planar or other type. The antenna is constituted by positioning K antenna array elements (K=2 or more) on the distance of about half a wavelength apart. RF signals are down-converted to signals of a suitable Intermediate Frequency (IF) in an RF/IF down-converter 202. Thereafter, frequencies of the signals are down-converted to baseband analog signals again. Such baseband analog signals create the digital baseband signal $r_1(k), r_2(k), \ldots,$ and $r_K(k)$ sampled as twice or more of Nyquist frequencies by the analog-to-digital conversion section 203. The digital baseband signal $r_1(k), r_2(k) \ldots,$ and $r_K(k)$ may consist of Inphase (I) and quadrature (Q) respectively. Wherein, k is a time index of a discrete signal.

Figure 3:
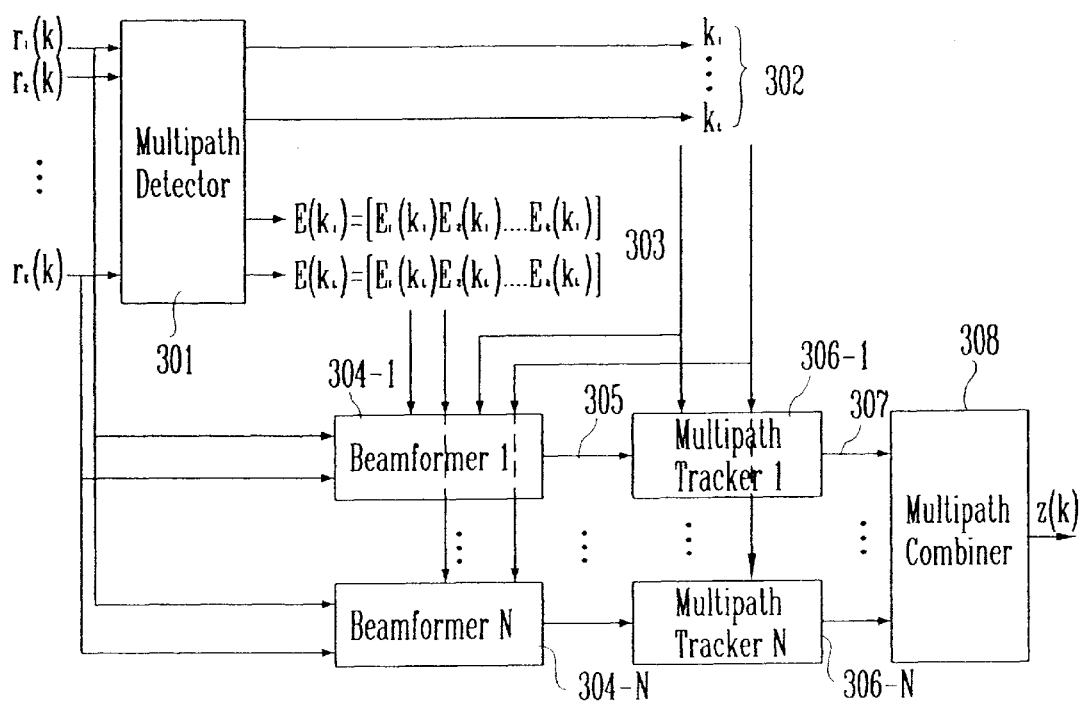
FIG. 3 shows a structure of a 2-D demodulator for the CDMA system with antenna array according to Example 1 of the present invention.

FIG. 3 shows a structure of a 2-D demodulator for the CDMA system with antenna array according to Example 1 of the present invention.

The signal a mobile station 102 of FIG. 1 in a cell 101 of FIG. 1 sends received in an antenna array 210 of FIG. 2 of a base station with K antenna array elements, is constituted as the sampled digital baseband signal $r_1(k), r_2(k) \ldots,$ and $r_K(k)$ after down-conversion of frequencies to a baseband signal, and becomes an input signal of a 2-D demodulator.

If the total number of mobile stations activated in the corresponding cell 101 of FIG. 1 is called U, the number of channel cards in a base station shall be larger than U at least, considering handoffs, and an example of a 2-D demodulator to exist in a channel card which demodulates signals of the i-th mobile station is shown in FIG. 3. Only a data path is shown in FIG. 3, but a separate control path may be constituted, using a micro controller in implementation.

A multipath detector 301 outputs time $(k_1, k_2, \ldots, k_L)$ 302 where multipath signals are located in, using one of the methods such as the maximum likelihood detection, the parallel detection or the hybrid detection which mixes the two method appropriately, and outputs correlation value $E(k_1), \ldots, E(k_L)$ 303 of K×1 snapshot signals in each time and estimated code sequences. To output only the information to conform to reliable multipath signals then, a correlation value is recognized as reliable information only when the value is larger than the threshold value after being compared with a threshold value established in advance, and is output from a multipath detector 301. This multipath detector 301 could be comprised of multiples to redure multipath detection time, and this can be adapted to the multipath detector 401 in a same manner.

The number N for beamformers 304-1 to 304-N and multipath trackers 306-1 to 306-N may be selected properly, considering a sperating frequency band and geographical features of a corresponding cell, and only the L beamformers 304-1 to 304-N (N=L) and multipath trackers 306-1 to 306-N (N=L) are used if the number L of detected multipaths is smaller than N. However, if L is larger than N, only N multipath signals, which has the maximum value, are selected and used.

The correlation value 303 constituted by information of I and Q is input to N beamformers 304-1 to 304-N for extracting space information from the (K×1) input signal $r_1(k), r_2(k), \ldots, r_K(k)$, and helps beamformers 304-1 to 304-N output scalarr signals 305 of linear combination, utilizing the space information associated with incoming direction of (K×1) input signal to the utmost. Multipath trackers 306-1 to 306-N execute code tracking for close conformity to transmitting codes for each multipath, using DLL (Delay Locked Loop), TDL (Tau-Dither Loop) or their modified structures, after receiving time information 302 about L mulfipaths assigned by a multipath detector 301, that is, the phase information of transmitting codes. Such code sequence closely tracked is considered to be a transmitted code sequence and used for despreading of traffic channels. Then, the despreaded signals, as a result, become L scalar signals 307 through a time align process for each path and are input to a multipath combiner 308. In case of the coherent method to use pilot channels for each mobile station, phase correction for each path is executed by multipath trackers 306-1 to 306-N. Also, frequency tracking for each path is executed by multipath trackers 306-1 to 306-N and measured error components are transferred to a multipath combiner 308 at the next end. The multipath combiner 308 to combine information in a time area combines such L signals 307 by the methods of the Equal Gain Combining (EGC), the Maximum Gain Combining (MGC) or other methods and creates the output z (k). After decoding by a decoder (not indicated) which exists at the latter end of the demodulator such output z (k)is decided to be one information between '0' or '1' by a slicer and output. Also, the multipath combiner 308 executes coupling in a time area for frequency error components for each path extracted by a multipath tracker 306-1 to 306-N in the time area.

The demodulator of a 2-D structure of FIG. 3 may apply to all transmitting signals of the coherent method to use pilot channels for each mobile station and the noncoherent method not to use pilot channels. In case of the coherent method, pilot channels are used in a multipath detector 301 and multipath trackers 306-1 to 306-N for detecting and tracking code synchronization, but traffic channels or separate preamble signals are used for such operation in the noncoherent method. In this case, data accumulation period, for calculating correlation values in a multipath detector 301 and multipath trackers 306-1 to 306-N, may be different in each method. If orthogonal codes such as Walsh codes or separate codes for user differentiation are used, its decovering is executed in a multipath detector 301 and multipath trackers 306-1 to 306-N in addition.

Figure 4:
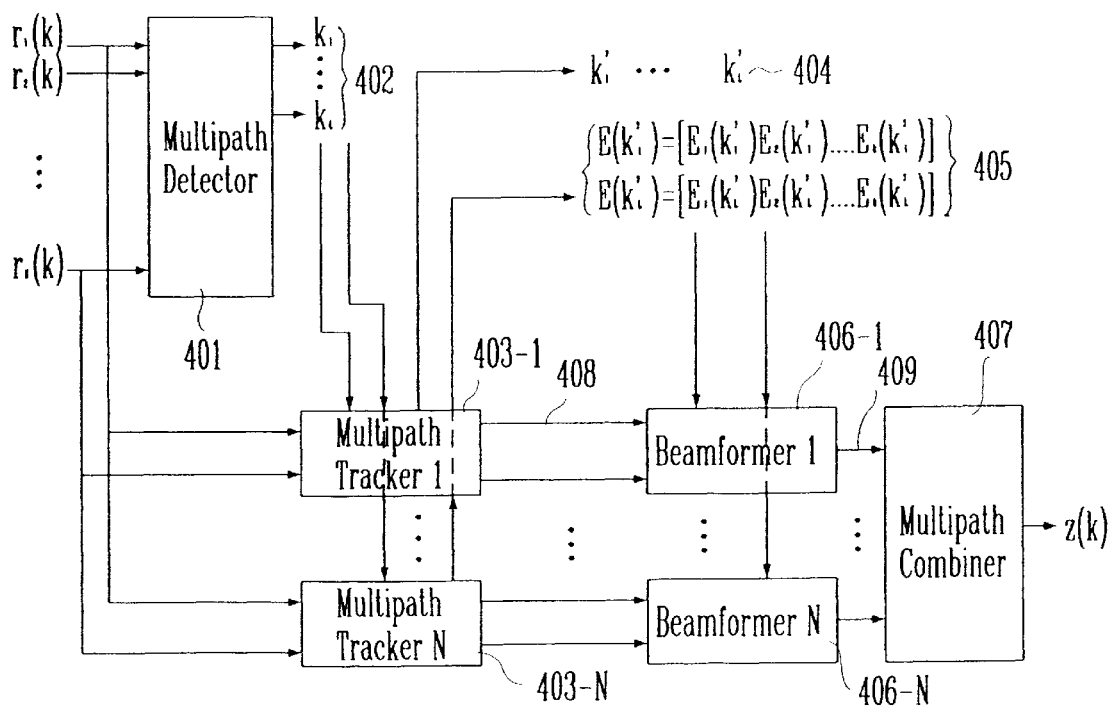
FIG. 4 shows a structure of a 2-D demodulator for the CDMA system with antenna array according to Example 2 of the present invention.

FIG. 4 shows a structure of a 2-D demodulator for the CDMA system with an antenna array according to Example 2 of the present invention, and beamformers 406-1 to 406-N are located in the latter part of multipath trackers 403-1 to 403-N, compared with FIG. 3.

Multipath trackers 403-1 to 403-N receives, from a multipath detector 401, time-domain information $k_1, \ldots k_L$ 402 multipaths exist, executes more refined path tracking for each path, and outputs more refined time information $(k'_1, k'_2, \ldots, k'_L)$ 404 for each multipath, while it outputs correlation value $E(k'_1), \ldots, E(k'_L)$ 405 of (K×1) snapshot signals and tracked code sequences in the time. The despreaded (K×1) signals 408 through multipath trackers with time information 404 and 405 for such space signals are input to beamformers 406-1 to 406-N for beamforming and create scalar signals 409 for each path. Signals for these paths are combined by a multipath combiner 407 and create output signal z (k). Difference between a multipath tracker 306 in FIG. 3 and a multipath tracker 403 in FIG. 4 is as follows. The multipath tracker 306 in FIG. 3 operates by input of scalar signals 305 from beamformers 304, while the multipath tracker 403 in FIG. 4 shall be the (K×1) vector multipath tracker by input of a (K×1) vector type. Difference between beamformers 304 in FIG. 3 and beamformers 406 in FIG. 4 is that the beamformer 304 in FIG. 3 shall process input data of rapid speed the same with a multipath tracker, while the beamformer 406 in FIG. 4 only processes input data of low speed, despreaded by a multipath tracker 403. Namely, structures of FIG. 3 and FIG. 4 may be said mutual supplement relation for processing speed of beamformers 304 and 406 and implementation complexity of multipath trackers 306 and 403. However, the beamformer 304 in FIG. 3 can slow update speed of beamforming provided that a mobile station exists in formed beams, and this results from limited mobile speed of a mobile station. Also, beamformers 304 and 406 in FIG. 3 and FIG. 4 may be located with multipath trackers 306 and 403 in parallel and execute the above mentioned functions.

Figure 5:
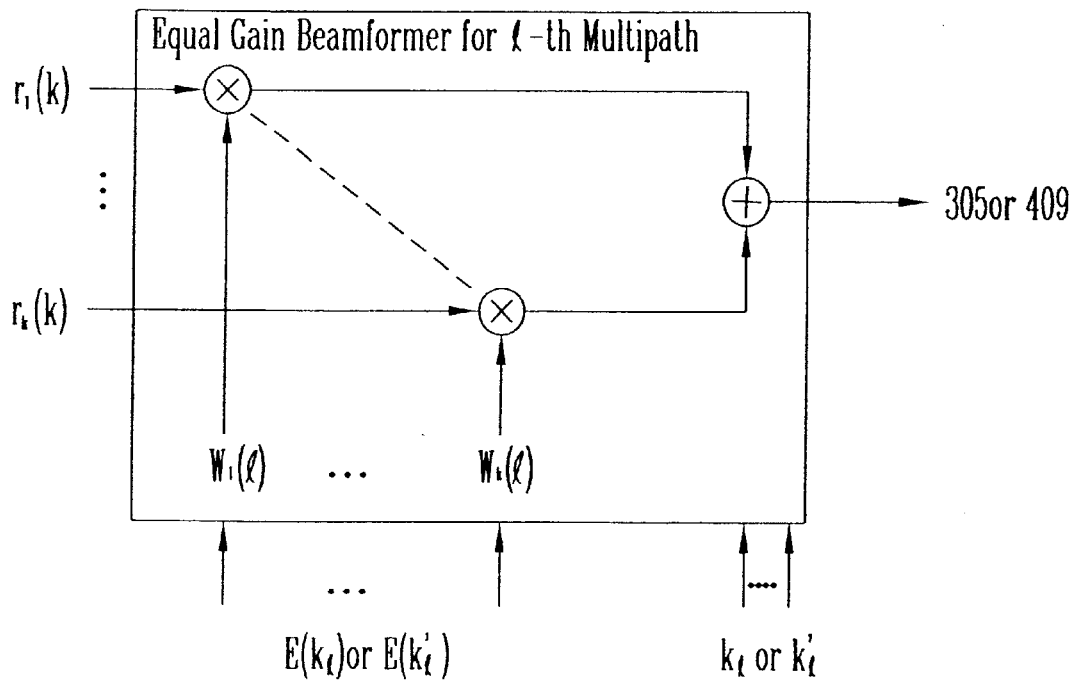
FIG. 5 shows Example 1 of a beamformer for a 2-D demodulator according to the present invention.

FIG. 5 shows, as Example 1 of beam formers for 2-D demodulators according to the present invention, a structure of a equal gain beamformer.

The (K×1) beamforming weighing factor $W_1(l)$, . . . and $W_K(l)$ become $E(k_l)$ 303 or $E(k'_l)$ 405 in the l-th path. An equal gain beamformer needs (K×1) data signal $r_1(k)$, $r_2(k)$, . . . and $r_K(k)$, the (K×1) correlation value $E(k_l)$ or $E(k'_l)$ for the l-th multipath, and time information $k_l$ or $k'_l$ where multipath signals are located, as input signals. The (K×1) input signal $r_1(k)$, $r_2(k)$, . . . and $r_K(k)$ are multiplied by the (K×1) beamforming weighting factor $W_1(l)$, . . . , and $W_K(l)$ and all of them are added. And then the signal outputs scalar values 305 of FIG. 3 or 409 of FIG. 4 with the results. Energy of such output signals has remarkable improvement effect for the signal-to-noise ratio (SINR), compared with using single antenna elements.

Figure 6:
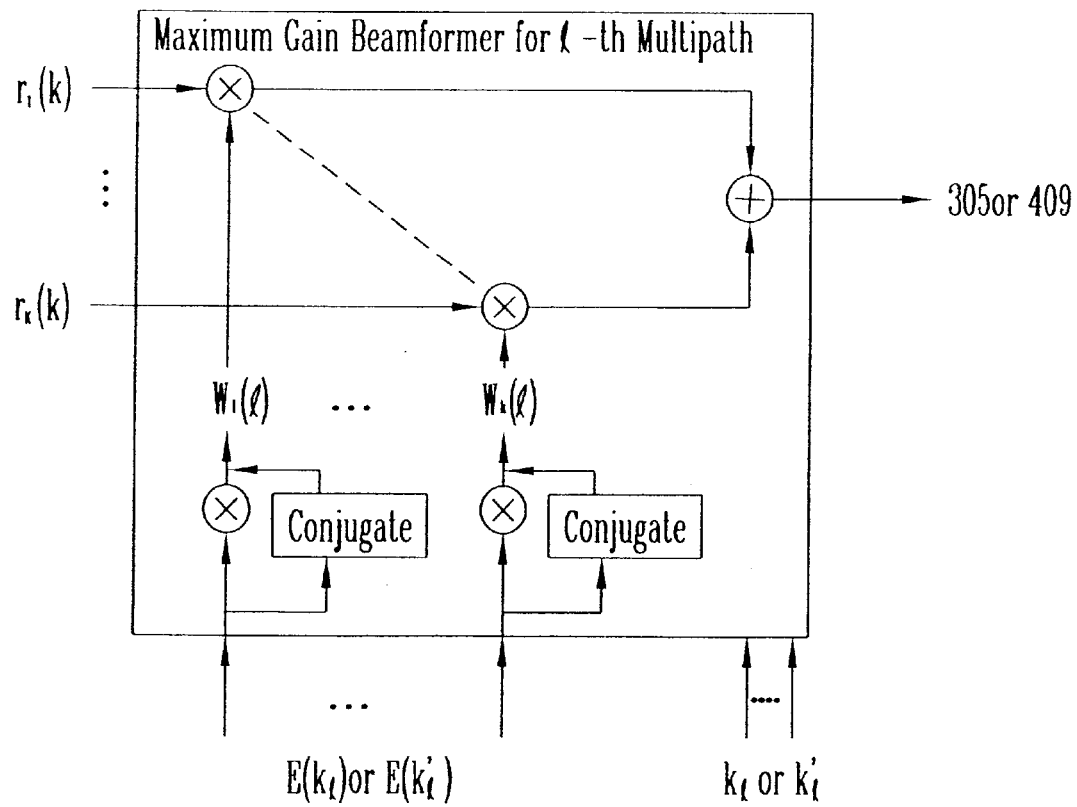
FIG. 6 shows Example 2 of a beamformer for a 2-D demodulator according to the present invention.

FIG. 6 shows a structure of a maximum gain beamformer as Example 2 of a beamformer for 2-D demodulators according to the present invention. All operating principles are the same with the case of the equal gain beamformer, other than the calculation method of beamforming weighting factors. The (K×1) beamforming weighting factors of a maximum gain beamformer are created by multiplying the (K×1) correlation value $E(k_l)$ 303 of FIG. 3 or $E(k'_l)$ 405 of FIG. 4 for the l-th multipath by its conjugate value. This is performed, providing that reliability of a strong signal is higher, compared with that of a relatively weak signal.

Figure 7:
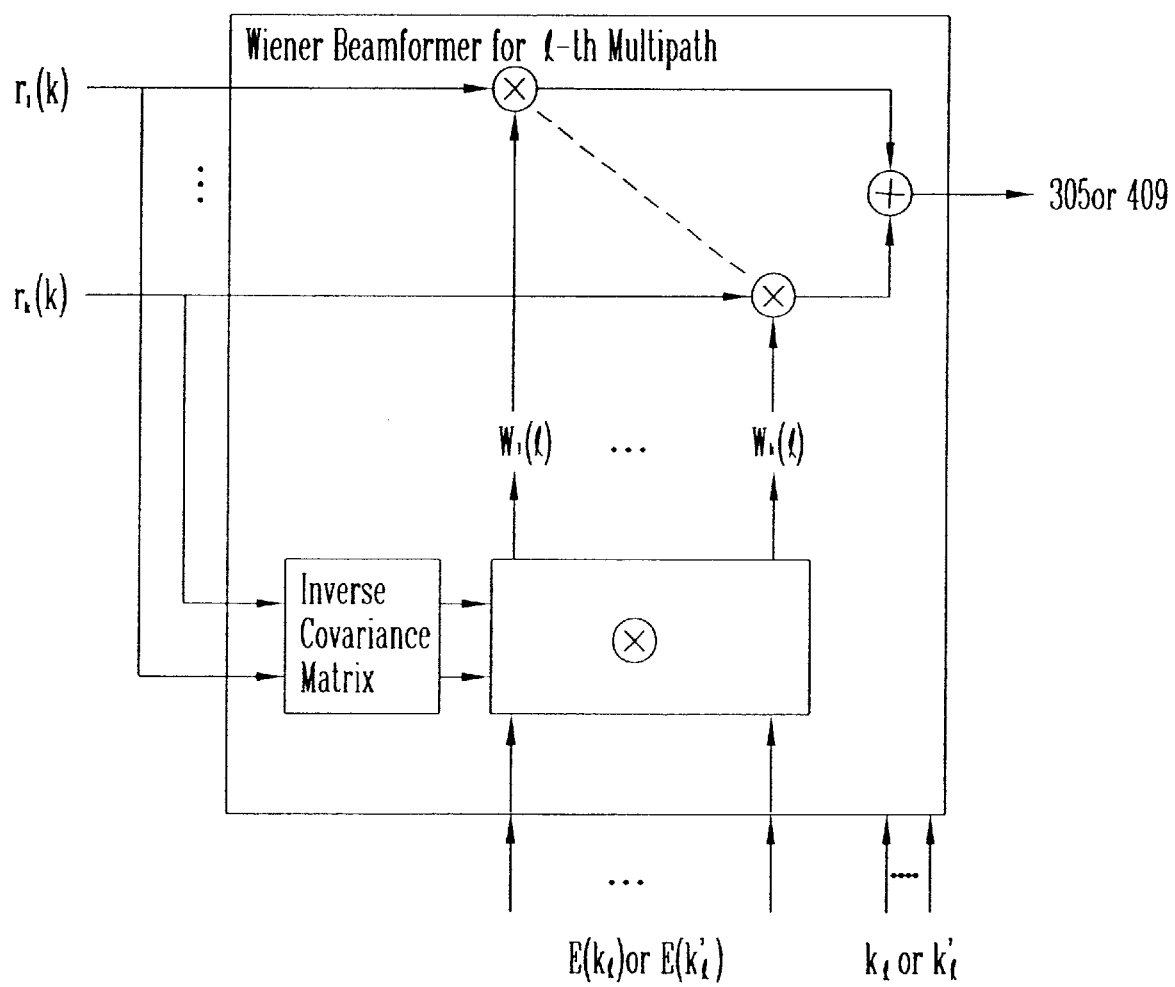
FIG. 7 shows Example 3 of a beamformer for a 2-D demodulator according to the present invention.

FIG. 7 shows a structure of a Wiener beamformer as Example 3 of a beamformer for 2-D demodulators according to the present invention. All operating principles are the same with the case of the equal gain beamformer, other than the calculation method of (K×1) beamforming weighting factors.

The (K×1) beamforming weighting factors of a Wiener beamformer are obtained by multiplication with the (K×K) inverse covariance matrix 701 of (K×1) data signal $r_1(k)$, $r_2(k)$, . . . and $r_K(k)$, considering the (K×1) correlation value $E(k_l)$ 303 of FIG. 3 or $E(k'_l)$ 405 of FIG. 4 for the l-th multipath as a reference signal. The Wiener beamformer minimizes the Mean Square Error (MSE) between a reference signal and the beamformer output. Various methods to calculate reliable (K×K) inverse covariance matrix 701 only using finite number of data are well known. Update of an inverse covariance matrix is possible adaptively in a time domain by the method to use the forgetting factor u, and etc. The forgetting factor may have a value from 0 to 1, but may acquire it generally between 0.8 and 1.

All basic principles mentioned until now may apply to beamforming of signals for transmitting from a base station 102 with antenna array to a mobile station 103.

As described above, a 2-D demodulator gives excellent effect, which can increase coverage area of a base station and system capacity, compared with a CDMA system not to use antenna array, by implementing a 2-D demodulator which can extract and combine all information needed in time and space domains, using only the information which shall be calculated in the CDMA system, not the algorithm such as direction finding to require separate complicated calculation.

While the present invention has been described and illustrated herein with reference to the preferred embodiment thereof, it will be understood by those skilled in the art that various changes in form and details may be made therein without departing from the spirit and scope of the invention.

What is claimed is:

1. A two-dimensional demodulator for a Code Division Multiple Access system with antenna array, comprising:
   a multipath detector which receives sampled digital baseband signals and outputs time information concerning where multipath signals and phase information of transmitting codes are located, and outputs correlation values after comparing a correlation value of a snapshot signal and an estimated code sequence with a threshold value established in advance when the correlation value is larger than the threshold value;
   multiple beamformers which receive the correlation values output from said multipath detector and sampled digital baseband signals, and create multiple scalar signals in linear combination, using space information associated with an incoming direction of said sampled digital baseband signals;
   multiple multipath trackers which execute code tracking for phase conformity with transmitting codes and create multiple scalar signals and frequency error components for each path after passing through a time alignment process for each path, using the phase information of transmitting codes output from said multipath detector, and scalar signals from said multiple beamformers; and
   a multipath combiner which combines multiple scalar signals and frequency error components created from said multiple multipath trackers for the time domain respectively.

2. The demodulator of claim 1, wherein said beamformer is an equal gain beamformer which combines said sampled digital baseband signals and beamforming weighting factors after multiplying them, and outputs scalar values from input sampled digital baseband signals, correlation values of snapshot signals in a certain time and tracked code sequences, and time information for multipaths.

3. The demodulator of claim 1, wherein said beamformer is a maximum gain beamformer which combines a beamforming weighting factor created by multiplying a correlation value and its conjugate of a snapshot signal in a certain time and a tracked code sequence, and outputs scalar values.

4. The demodulator of claim 1, wherein said beamformer is a Wiener gain beamformer which combines beamforming weighting factors created by multiplying correlation values of snapshot signals in a certain time and tracked code sequence, with sampled digital baseband signals, and outputs scalar values.

5. The demodulator of claim 1, wherein said two-dimensional demodulator comprises a microcontroller which constitutes a separate control path or connects said beamformers and said multipath trackers in parallel.

6. A two-dimensional demodulator for a Code Division Multiple Access system with antenna array, comprising:

a multipath detector which receives sampled digital baseband signals and outputs time information concerning where multipath signals, and phase information of transmitting codes, are located;

multiple multipath trackers which execute code tracking for each path by input of the phase information of transmitting codes output from said multipath detector, and create time information for multipaths, corresponding to time information for space signals, and correlation values of snapshot signals in each time and tracked code sequence;

multiple beamformers which create scalar signals for each path by input of the time information for space signals created from said multiple multipath trackers and of despreaded snapshot signals of inverse diffusion; and a multipath combiner which combines scalar signals of each path, created from said multiple beamformers.

7. The demodulator of claim 6, wherein said beamformer is an equal gain beamformer which combines sampled digital baseband signals and beamforming weighting factors after multiplying them, and outputs scalar values from input sampled digital baseband signals, correlation values of snapshot signals in a certain time and tracked code sequences, and time information for multipaths.

8. The demodulator of claim 6, wherein said beamformer is a maximum gain beamformer which combines a beamforming weighting factor created by multiplying a correlation value and its conjugate of a snapshot signal in a certain time and a tracked code sequence, with a sampled digital baseband signal, and outputs scalar values.

9. The demodulator of claim 6, wherein said beamformer is a Wiener gain beamformer which combines beamforming weighting factors created by multiplying correlation values of snapshot signals in a certain time and a tracked code sequence by an inverse covariance row of a sampled digital baseband signal, with sampled digital baseband signals, and outputs scalar values.

10. The demodulator of claim 6, wherein said two-dimensional demodulator comprises a microcontroller which constitutes a separate control path or, connects said beamformer and said multipath tracker in parallel.

* * * * *